Dec. 7, 1954    R. K. SHEWMON ET AL    2,696,580
REVERSIBLE MOTOR CONTROL
Filed Aug. 27, 1951

INVENTORS
RALPH K. SHEWMON AND
CLYDE C. FREY
BY
Willits, Hardman and Fike
THEIR    ATTORNEYS

United States Patent Office 2,696,580
Patented Dec. 7, 1954

2,696,580

REVERSIBLE MOTOR CONTROL

Ralph K. Shewmon and Clyde C. Frey, Dayton, Ohio, assignors to General Motors Corporation, Detroit, Mich., a corporation of Delaware Application August 27, 1951, Serial No. 243,904

12 Claims. (Cl. 318—281)

This invention relates to a control device for an electric motor capable of reverse operation.

It is among the objects of the present invention to provide a reversible electric motor with control mechanism operating to cause the electric motor operation to be reversed recurrently at predetermined intervals with a minimum lag at time of reversal.

A further object of the present invention is to provide the reversible electric motor with speed and current controlled protective devices which shield the motor against electrical damage if abnormal operating conditions arise or if the control mechanism is improperly operated.

Further objects and advantages of the present invention will be apparent from the following description, reference being had to the accompanying drawings wherein a preferred embodiment of the present invention is clearly shown.

Figure 1:
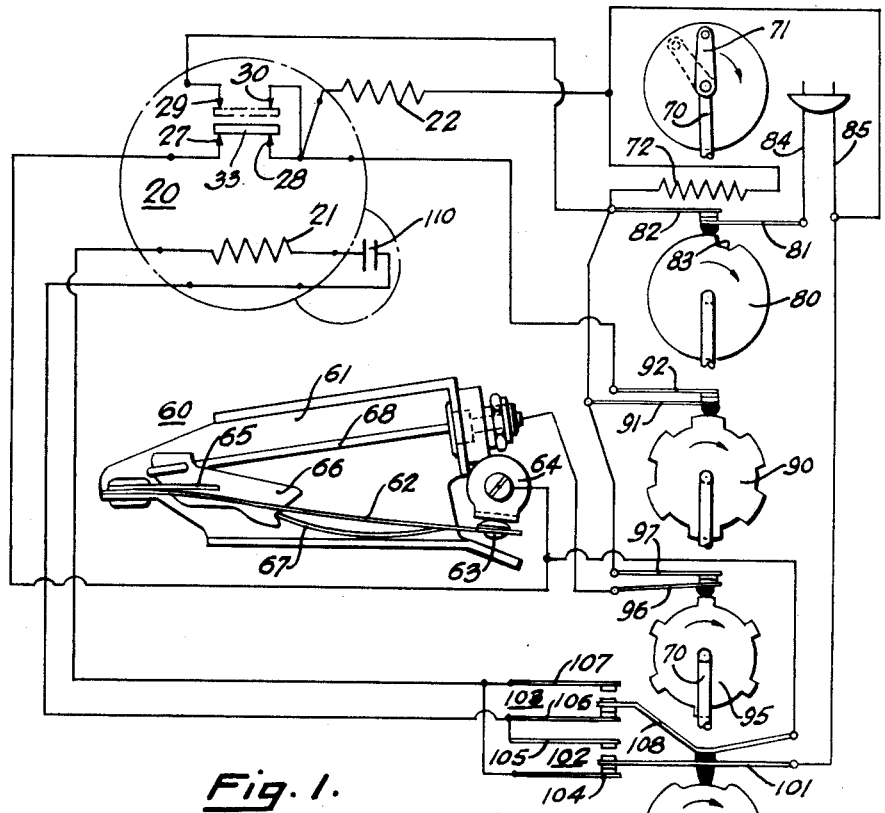
Fig. 1 is a pseudo diagrammatic and constructional view illustrating the reversible electric motor and its electrical connections with elements forming the control device therefor.

The electric motor 20 of the present invention is of the reversible type, having a phase or starting winding 21 and a main or running winding 22. As disclosed in this application the electric motor and its associated control apparatus is particularly adapted for use in a laundering machine having a tub adapted to be rotated in one direction at different speeds for one complete laundering operation which may consist of the washing operation at one rotating speed, an extraction operation at a higher speed, a rinse operation at the lower speed, another higher speed extraction operation, a second rinse operation followed by the final extraction operation after which the machine is stopped, having completed the desired number of operations constituting what may be termed one laundering cycle of the machine.

It is desirable that the rotation of the tub during one complete laundering cycle of the machine be continual and uninterrupted and that its rotational speed during said machine cycle does not drop appreciably below the slower speed during which the washing and rinsing operations are performed. Usually in machines of this kind a unidirectional power device or electric motor is used and to obtain the different tub speeds, intricate gear transmission and shifting means are necessary. The electric motor of the present invention is reversible and drives the unidirectional tub at one speed when operating in one direction and at another, higher speed when operating in the opposite direction. To do this, oppositely acting automatic clutches are interposed in the drive connections between the tub and motor with suitable speed change gearing associated with each clutch.

The electric motor 20 is equipped with a centrifugal switch adapted to close a gap in the circuit of the starting winding while the motor is inactive or operating below a predetermined receiving speed. This switch is schematically shown in the Figs. 1 and 4 and constructionally in Figs. 2 and 3. It consists of an insulating plate 25, anchored to the inside of motor end cover 26 and supporting two pairs of spaced terminal contacts 27—28 and 29—30 respectively. Studs 31 and 32 secure the plate 25 to the cover 26. The movable member of the switch is in the form of a metallic skillet 33 having a dished disc portion 34 and an extension 35. On this extension 35 there are mounted two pairs of contacts 37—38 and 39—40, in spaced relation so as to be engageable with the stationary terminal contacts 27—28 and 29—30 respectively. The dished portion 34 of the member 33 has a central opening through which the rotor shaft 42 of the motor extends with ample clearance to assure against contact with said shaft. Another opening 43 has the headed stud 31 extending through it, the stud 32 extending through a similar opening 44 in said skillet portion 35. These studs movably support the skillet 33 on the end cover 26 so that the several contacts on the skillet and on the plate 25 may cooperate to make and break electrical circuits. A spring 45 surrounding the stud 32 and interposed between the head of stud 32 and the skillet portion 35, yieldably urges the skillet so that its pair of contacts 39—40 engage stationary terminal contacts 29—30 respectively and they, acting as a pivot for the skillet, cause the skillet contacts 37—38 to be held out of engagement with the stationary terminal contacts 27—28 due to the tilt of the skillet 33 by spring 45.

Figures 2, 3, 4:
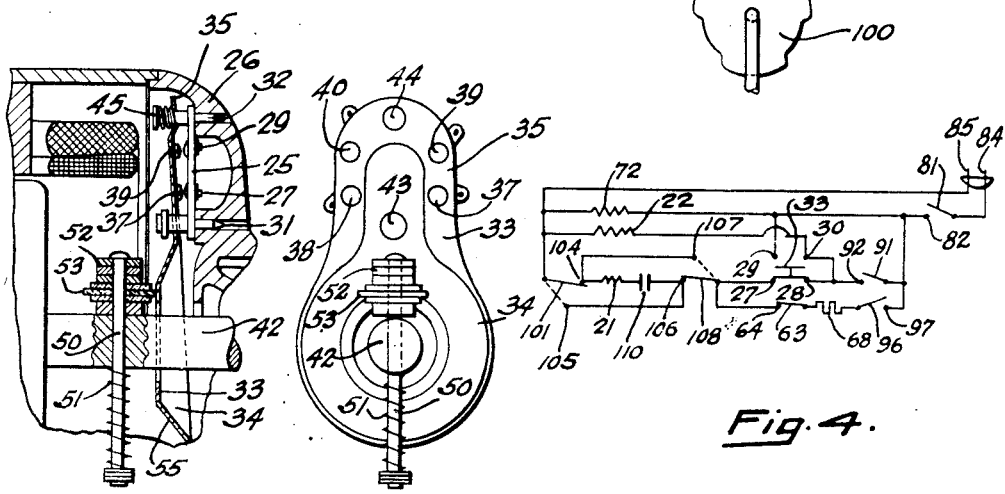
Fig. 2 is a fragmentary, sectional view of the electric motor and the switching mechanism actuated thereby.
Fig. 3 is another view of the motor actuated switching mechanism.
Fig. 4 is a simple wiring diagram of the elements and electrical circuits illustrated in Fig. 1.

Rotor shaft 42 has a diametral hole in which a pin 50 is slidably supported. The headed end of said pin, extending from one side of shaft 42 has a spring 51 surrounding it, said spring engaging the shaft 42 and the head on pin 50. The pin portion extending from the opposite side of shaft 42 has a plurality of washers 52 of predetermined diameter and weight attached thereto and two insulating washers between which a washer 53 of any suitable fibrous material is clamped. Washer 53 is of larger diameter than any of the other washers on pin 50 so that it is constantly engaged by the convexed surface 55 of the skillet portion 34 due to the influence of spring 45. When the electric motor is inactive, spring 51 maintains pin 50 and the elements mounted thereon in the position as shown in Fig. 2 so that the skillet 33 is held in the position in which the pair of contacts 37—38 engage 27—28 to close this gap in the starting winding circuit and in which the pair of contacts 39—40 are held out of engagement with the cooperating pair 29—30 to open the auxiliary running winding circuit of the motor 20. As the motor starts to run, the weights 52 on pin 50, due to centrifugal force, will move outwardly of shaft 42 against the opposing effect of spring 51. As this happens, washer 53 engaged by the skillet 33 will traverse the declining surface 55 of skillet portion 34 and thereby permit the spring 45 to tilt the skillet clockwise, the engaging contacts 37—27 and 38—28 acting as the pivot about which the skillet is tilted. When the motor reaches a predetermined operating speed, the washer 53 will have been moved outwardly of shaft 42 so that it rides upon a sufficiently low annular track on the declining surface 55 to permit spring 45 to tilt the skillet so that contacts 39—29 and 40—30 engage and contacts 37—27 and 38—28 are disengaged. As a result, this gap in the auxiliary running winding circuit is closed and the starting winding circuit is opened, thereby maintaining motor operation. This motor actuated, centrifugal switch is the subject matter of U. S. Patent 2,182,977 issued to C. J. Werner December 12, 1939.

The electric motor 20 is also equipped with a current controlled relay 60 which controls motor operation in accordance with the current flow therethrough. This relay 60 comprises a frame 61 to which one end of a resilient blade 62 is attached. A contact 63 is attached to blade 62 adjacent its free end, said contact being engageable with a stationary contact 64 insulatingly supported in the relay assembly. A blade spring 65 anchored to frame 61 movably supports an actuator 66 which provides an abutment for one end of a flexible biasing finger 67 secured to or formed integral with the blade 62. The actuator 66, under the influence of spring 65 shifts the finger 67 to the side of blade 62 so that said finger biases said blade to move its contact 63 into engagement with the stationary contact 64. However, if the actuator is moved so that the end of finger 67 engaging the actuator is shifted to the opposite side of blade 62, then said finger biases the blade 62 to move its contact 63 out of engagement with stationary contact 64. A thermo-electric element 68, in the form of a wire, has its one end electrically and mechanically attached to the actuator 66 and its opposite end adjustably and insulatingly secured to the rigid frame 61. This element 68 is normally tensioned so that it holds the actuator 66 in the position as shown in Fig. 1, in which the finger 67 biases blade 62 to have its contact 63 engage contact 64. A current flow of predetermined value and/or duration, flowing through element 68 will cause it to become heated and expand, thereby permitting the spring 65 to move the actuator so that finger 67 has its biasing effect upon blade 62 reversed and as a result, blade 62 is biased to move its contact 63 out of engagement with contact 64.

To meet the requirements of the present installation, the motor operation is controlled by a timer having a plurality of circuit make and break devices or switches operated at recurrent, predetermined intervals. The timer designed and constructed to perform its functions at properly timed and repeated intervals consists of a common drive shaft 70 rotatable manually in one direction by lever 71 and by any suitable electrical power device in the same direction, said device having an energizing winding 72 causing it to rotate in said same direction. Normally lever 71 is in the dotted line position, Fig. 1, but is manually operative clockwise into the full line position in which the timer mechanism is set to be electrically driven clockwise so as to control the electric motor as it operates the driven member, a laundering tub in the installation previously referred to, through the complete operation's cycle.

The shaft 70 of the timer mechanism has a plurality of switch actuating cams mounted thereon so as to rotate therewith. The first cam 80 actuates the movable contact 81 to engage the stationary contact 82 of the first switch. When lever 71 is in the normal or dotted line position, Fig. 1, cam 80 will have its single notch 83 in a position in which the follower on contact 81 will rest in said notch to permit contact 81 to move away from and disengage contact 82. However, when lever 71 is moved into its timer setting position, full line Fig. 1, then cam 80 is rotated concurrently into the position in which contact 81 engages contact 82 and is maintained in this contact engaging position while the cam is being rotated clockwise by the electrical timer operating mechanism including winding 72. When the cam reaches its normal position, the contact 81 is again separated from contact 82 due to the follower entering the notch 83. The movable contact 81 is connected to one power line 84. The stationary contact is connected with the terminal contact 29 of the motor controlled centrifugal switch and with one end of the timer winding 72, the other end of said timer winding being connected with the other power line 85 to which one end of the running winding is also connected.

The second cam 90 of the timer mechanism has a plurality of alternate rise and fall surfaces to be engaged by the cam follower on movable contact 91 engageable with stationary contact 92. In the installation selected for this application there are six each of the said rise and fall surfaces, one of said rise surfaces being engaged by the follower of contact 91 to hold said contact in engagement with its cooperating contact when the timer is initially manually operated into its "set" position (Fig. 1). As cam 90 is rotated clockwise by the electrically driven power device including winding 72, it will recurrently open and close contacts 91 and 92 at predeterminately timed intervals, specifically six times during a complete cycle of operation in the present installation.

The third cam 95, driven by shaft 70, has six equally spaced riser areas which engage the cam follower on movable contact 96 to move it into engagement with the stationary contact 97 for predetermined periods at predetermined intervals. When the follower rides over the depressed area between adjacent riser areas, the contact 96 is disengaged from contact 97.

For this installation the fourth cam 100 has three equally spaced lobes providing alternate high and low areas upon which the cam follower on movable contact 101 rides. Cam 100 controls two reversing switches 102 and 103 contact 101 being the movable member of switch 102. When the follower on contact 101 traverses a low area on cam 100, as shown in Fig. 1, contact 101 engages the one stationary contact 104 of switch 102. When the follower traverses a high area on cam 100, contact 101 engages contact 105 and is disengaged from contact 104. Switch 103 also has two stationary contacts 106 and 107 the former being electrically connected with contact 105, while contact 107 is electrically connected with contact 104. The movable contact 108 of switch 103 is mechanically tied to and insulated from contact 101 so that the two move in unison. Contacts 101 and 108 therefore are operative respectively to engage contacts 104 and 106 concurrently while the cam follower on contact 101 traverses a low area and to engage contacts 105 and 107 concurrently when said follower traverses a high lobe area of cam 100.

The movable contact 91 controlled by cam 90 is connected with the stationary contact 82 and with the stationary contact 97 of the switch controlled by cam 95. Stationary contact 92, cooperating with movable contact 91 is connected with the running winding 22, and contacts 28 and 30 of the centrifugal switch driven by the motor 20. The movable contact 96 actuated by cam 95 is connected to the thermo-electric element 68 of the current controlled relay 60. The stationary contact 64 of said relay is connected to both the movable contact 108 of reversing switch 103 and to the contact 27 of the motor driven centrifugal switch. The movable contact 101 of the reversing switch 102 is connected to the power line 85. Both stationary contacts 104 and 107 of reversing switches 102 and 103, respectively, are connected with one end of the starting winding 21, the other end of said starting winding being connected to a capacitor 110, which in time is also connected with stationary terminals 105 and 106 of the reversing switches 102 and 103 respectively.

When the apparatus is at rest, the timer operating lever 71 is in the dotted line position of Fig. 1. Now cam 80 is positioned so that its notch 83 is occupied by the follower on contact 81 and thus this contact is disengaged from contact 82 thereby opening the side 84 of the main power line. To render the apparatus active so that motor 20 operates the mechanism to which it is mechanically connected, as for instance a laundering machine, the attendant turns lever 71 clockwise into the full line position as shown in Fig. 1. This turns the shaft 70 and initially sets all of the switch controlling cams thereon substantially as shown in Fig. 1. Now contacts 81 and 82 are engaged and the timer electric drive winding 72 is energized so that the timer, including cam carrying shaft 70 is rotated clockwise at a predetermined rate. An energizing circuit through the running winding 22 of motor 20 is completed through the now engaging switch contacts 81—82 and 91—92, this circuit being established independently of the motor controlled, centrifugal switch.

To start the motor it is necessary to complete the circuit through the starting winding, in one direction for causing the motor to run in the one direction and through the starting winding 21 in the opposite direction for causing the motor to run in the reverse direction. The closing of contacts 81—82 completes a circuit as follows: from the power line 84, contacts 81—82, contacts 91—92 closed by cam 90, contact 28 of the motor actuated switch, contact 38, bridging skillet 33 and contact 27 of said switch, contact 108 of reversing switch 103, contact 106, capacitor 110, starting winding 21, in one direction, contacts 104 and 101 of reversing switch 102, to the other power line 85. This circuit energizes starting winding 21 to start the motor to rotate in one direction, for instance forward. As soon as the electric motor attains a predetermined running speed, the centrifugal switch, actuated by the motor will effect shifting of the bridging skillet 33 to disengage contacts 27—28 for discontinuing the above described starting winding circuit and to engage and bridge the contacts 29—30 whereby an auxiliary circuit through the running winding 22 is completed which is not broken when cam 90 causes contacts 91—92 to be separated during its rotation by shaft 70. This auxiliary circuit is as follows: from power line 84, across contacts 81—82 to centrifugal switch contact 29, across the skillet 33 to contact 30, thence through running winding 22 to the other power line 85.

Under the circumstances described in the aforegoing paragraph, the electric motor 20 will continue to run in the forward direction. However, as stated previously, the motor has its running direction reversed repeatedly during a cycle of machine operation. This reversal is attained in the following manner: after a predetermined increment of timer operation and while the contacts 96—97 as well as contacts 91—92 are open, cam 100 operates contacts 101 and 108 so that the former disengages contact 104 and engages contact 105 and contact 108 disengages contact 106 and engages contact 107. This current reversing switching mechanism is shifted while no current flows through it in order to eliminate arcing, inasmuch as the comparatively heavy starting winding current flows therethrough. Predeterminately after the reversing switches 102 and 103 have been shifted, contacts 91 and 92 are again closed following which contacts 96—97 will be engaged under the control of cam 95. Now current will flow from the power line 84, across contacts 81—82, contacts 97—96, through thermoelectric element 68, blade 62, contacts 63—64, reversing switch contact 108 and its now engaged contact 107, to and through starting winding 21 in the direction opposite the previous flow therethrough which started the motor 20 to operate in the direction it is presently operating, thence through the capacitor 110 to contact 105 now engaged by contact 101 and back to the other power line 85.

When the afore described directional current flow through the starting winding 21 is established while the electric motor is still running in the forward direction, counter electro-motive forces are set up in the motor, acting as a braking force which quickly brings the motor to a stop and then just as quickly starts the electric motor to operate in the reverse direction. As the motor reaches a predetermined decelerating speed due to the braking effect by the starting winding, the centrifugal switch, driven by the motor, will automatically shift, moving the bridging skillet 33 from running winding contact 29—30 to engage the starting winding contacts 27—28. Engagement of contacts 91—92 by actuation of cam 90, causes current from the power line 84 and contacts 81—82 to flow across contacts 91—92 to contact 28, bridging skillet 33, contact 27 to the reversing switch contact 108, contact 107, starting winding 21, condenser 110 contacts 105—101 to the other power line 85. Current flow through the thermal relay, established by closing of contacts 96—97 is maintained during and for a predetermined interval after reversed motor operation. The relay will open in response to the flow of the starting current therethrough and thus break said starting winding circuit established across contacts 63—64. These contacts remain open until contacts 96—97 are separated by cam 95 after which the element 68 in the relay has contracted by cooling, sufficiently again to engage contacts 63—64. The running winding circuit during this time is the one established across contacts 91—92 through winding 22 independently of the centrifugal switch. This circuit is effective until the centrifugal switch is again actuated when the electric motor reaches a predetermined operating speed, at which time the skillet 33 will engage and bridge contacts 29—30 to establish the auxiliary circuit through the running winding 22 independently of switch contacts 91—92. This auxiliary circuit provides motor protection against main winding burn out if power lines 84—85 should be accidently disengaged from the power source at any time when contacts 91—92 are open. When the power plug is disengaged, motor 20 stops. When plug is replaced, 91—92 being open, the running winding as well as starting winding are disconnected from the line 84 and running winding 22 cannot be accidently left across the line as both starting winding 21 and main 22 are energized after such a circuit interruption only when contacts 91—92 close.

As designed for the particular installation shown in this application, the timer effects motor operation three times forwardly and three times reversely. Cam 80 of the timer, when actuated manually in a clockwise direction, closes the main control switch 81—82 and it remains closed during the entire time of operation of the timer by the electrical means including winding 72, said cam again opening switch 81—82 and rendering all electrical circuits ineffective when the timer cycle has been completed in its counterclockwise rotation by the electrical means.

Inasmuch as the motor driven, centrifugal switch is in the running winding circuit closing position and in the starting winding opening position while the motor is operating at the predetermined running speed, the hot wire relay 60 is provided to effect a circuit through the reversing switches 102 and 103 and the starting winding 21 while the electric motor is running at operating speed so that said motor is braked and brought to quick stop for quick reversal purposes which, in the present installation, does not permit the driven laundry tub to decelerate appreciably when a change in its functions is made, as for instance from washing to extraction and then to rinsing, the latter two functions being repeated.

While the embodiment of the present invention as herein disclosed, constitutes a preferred form, it is to be understood that other forms might be adopted.

What is claimed is as follows:

1. In combination with a reversible electric motor having starting and running windings connectable with a source of electric power, of a motor driven switch normally closing one circuit including the starting winding and being operative in response to a predetermined motor speed to open said one circuit and close a second circuit including the running winding; a timer manually operative in one direction and electrically operative in the same direction, said timer having means for electrically operating it in said direction, a plurality of switches, the first connected in circuit with the source of power, the timer operating means and one portion of the motor driven switch, the second switch being connected in series with the first switch, the running winding of the motor and another portion of the motor driven switch, the third switch being connected in series with the first switch and with a cooperating part of said other portion of the motor driven switch, and also in series with tandem reversing switches in the timer which are connected, one to one end of the starting winding, the other to the other end of the starting winding and also to the source of electric power and alternately vary the direction of current flow through said winding, the timer having actuating cams, one for each switch, each cam, during electrical operation of the timer, actuating its respective switch at predetermined timed intervals to first close circuit to the starting and running windings and upon opening of circuit to the starting winding and closing of a second circuit to the running winding by the motor driven switch open the first made circuit to the running winding and thereafter reverse direction of current flow to the starting winding to brake the motor to a stop and remake the first closed circuit to the running winding before the motor stops with the motor driven switch opening the second made circuit to the running winding and remaking the circuit to the starting winding.

2. In combination with a reversible electric motor having a starting winding and a running winding connectable with a source of electric power, of a timer manually operative in one direction to be set and electrically driven in the same direction, said timer having a plurality of switches and rotatable cams for actuating said switches in timed sequence, one cam closing one switch to connect the timer driving device with the source of electric power for a predetermined interval, the second cam controlling a second switch in series with the said one switch for making and breaking a direct circuit between the running winding and the source of power at predetermined intervals during the electrical operation of the timer, another cam being operative to actuate a pair of cooperating reversing switches in circuit with the starting winding of the motor, for reversing the connection between said starting winding and the source of power at predetermined intervals during the electrical operation of the timer; and a motor controlled switch in circuit with the reversing switches and connected in an auxiliary circuit connected with the running winding, said motor controlled switch being operative at a predetermined motor operating speed to open the starting winding circuit including the reversing switches and to complete said auxiliary running winding circuit.

3. In combination with a reversible electric motor having starting and running windings connectable to a source of electric power, of a motor controlled switch having two pairs of stationary terminals and a movable contactor normally engaging one pair of terminals and operative by the electric motor to disengage said one pair of terminals and engage the second pair of terminals when said motor attains a predetermined operating speed; a control mechanism having cam operated switches, said control mechanism being manually operative in one direction for setting purposes and electrically operative in the same direction for turning said cams at a predetermined speed, certain of said cam operated switches closing the circuit of said running winding and maintaining it closed during the cycle of electrical operation of said control mechanism, other of said cam operated switches cooperating with the motor controlled switch for controlling the starting winding circuit, still other of said cam operated switches alternately reversing current flow through the starting winding at recurrent, timed intervals during the electrical operation of the control mechanism; and electrical means operative to actuate the control mechanism, and rendered effective by one of the cam operated switches in response to manual operation thereof.

4. In combination with a reversible electric motor having starting and running windings connectable to a source of electrical power, of a centrifugal switch driven by the motor and having two pairs of stationary contacts an a movable contactor normally engaging one pair of contacts connected in the starting winding circuit and shiftable at a predetermined motor speed to disengage said one pair and engage the other pair of contacts in circuit with the running winding of the motor; a timer controller manually rotatable in one direction from normal position for setting purposes and electrically operated at a predetermined speed in the same direction, said timer having a plurality of concurrently rotatable cams each operative to actuate a separate switch, one of said switches being operative to connect a timer driving means with the source of power in response to manual operation of said timer and to cooperate with the motor driven switch at predetermined motor speed for connecting the running winding with the source of power, a second switch cooperating with said one switch to connect the running winding with the source of power, independently of the motor driven switch at recurrent, timed intervals during the cycle of electrical operation of the timer, said first and second switches cooperating with the motor driven switch when its contacts, in the starting winding circuit, are engaged by the movable contactor, for connecting reversing switches, in the timer and in circuit with the starting winding, with the source of power, whereby alternately reversed current flows through said starting winding are established in recurrent and properly timed sequence for reversing motor operation.

5. A device in accordance with claim 4 in which a current controlled relay is connected between the first switch and the reversing switches and in parallel with the motor driven switch and the second switch.

6. In combination with a reversible electric motor having starting and running windings connectable to a source of electrical power, of a centrifugal switch driven by the motor and having two pairs of stationary contacts and a movable contactor normally engaging one pair of contacts connected in the starting winding circuit and shiftable at a predetermined motor speed to disengage said one pair and engage the other pair of contacts in circuit with the running winding of the motor; a timer controller manually rotatable in one direction from normal position for setting purposes and electrically operated at a predetermined speed in the same direction, said timer having three separate, single switches and a pair of tandem reversing switches and an operating cam for each switch including the pair of reversing switches, the timer being manually operative in one direction for starting purposes whereby all switches are initially closed, and electrically actuated in the same direction whereby the several switches are actuated in timed, recurrent sequences, the timer having electrical means for actuating it at a predetermined speed and rendered active by the first switch which also connects the running winding of the motor with the source of power through the motor driven switch when said motor is operating at a predetermined speed, said first switch being connected in series with the second timer switch for connecting said running winding with the source of power independently of the motor driven switch at recurrent timed intervals during the electrical operative cycle of the timer, the reversing switches being simultaneously actuated by one cam, at recurrent timed intervals for connecting the first switch with the reversing switches and running winding for completing alternately reversed current flow circuits through said running winding at timed recurrent intervals.

7. A device in accordance with claim 6 in which a timer switch and a normally closed, current controlled relay are connected in circuit between the said first switch and the reversing switches and in parallel to the second switch and the motor actuated switch.

8. In combination with a reversible electric motor having starting and running windings adapted to be connected to a source of electric power, of a centrifugal switch driven by the motor, said switch normally closing a gap in the circuit of the starting winding and being operative at a predetermined motor speed to open said gap and close a gap in a circuit including the running winding; a timer having means for actuating it in one direction at a predetermined speed, said timer being manually operative in the same direction through a predetermined range for setting purposes; a plurality of timer actuated switches one of which is operative to close a circuit through the timer actuating means and a circuit through the running winding in cooperation with the centrifugal switch, the second switch, in cooperation with the first switch being operative at recurrent, timed intervals during the electrical operation of the timer, to complete a circuit through the running winding independently of the centrifugal switch and a circuit through the starting winding in cooperation with said centrifugal switch, the third switch cooperating with the first switch, with a current controlled relay and with a reversing switch mechanism for completing alternately reversed current flow circuits at recurrent, timed intervals through the starting winding, independently of the centrifugal switch.

9. In combination with a reversible motor having starting and running windings; of means for completing an electric circuit through both windings to start the motor in one direction or the other; motor controlled means operative at a predetermined motor speed to open the starting winding circuit and maintain the running winding circuit; means in the starting winding circuit for reversing the circuit connections therewith; a thermoelectric relay in circuit with the circuit reversing means operative to establish current flow through the starting winding for a predetermined interval, independently of the motor control switch causing the motor to stop and thereafter immediately start reverse operation; and means operative to effect energization of the relay and for actuating the reversing means.

10. In combination with an electric motor capable of running in either direction and having means for starting the inactive motor in one direction or the other or for stopping the running motor and causing it to be started in the opposite direction, of a plurality of switches certain of which are operative to complete circuits continuously to maintain motor operation and others being operative intermittently to complete circuits for starting the motor in one direction or the other; actuators for each of said switches; one actuator being operative to close its associated switch for rendering the motor active for a predetermined time interval while another actuator is rendered operative to open one associated switch and close a second associated switch also rendering the motor active, the actuator for the other switches being operative to close their respective switches for reversal of the motor rotation recurrently and at timed intervals during the opening of the switch operated by the said one actuator, and an overload relay connected in circuit with the motor by a switch and an associated actuator at predeterminately timed intervals concurrently with closure of the switch by said one actuator, said relay effecting control of the motor during response of the relay to the current flow through said relay.

11. In combination with an electric motor having running winding means effecting rotation of the motor in either of its two directions of rotation and additional starting winding means to start the inactive motor or to brake the running motor to a stop and to cause it to run in either of its two directions of rotation dependent upon the direction of current flow in said starting winding means, of a timer mechanism operable in one direction and having control switches in circuit with the said winding means of said motor and a source of electric power, said switches being operative to maintain operative running energization of the running winding continuously during a complete cycle of timer operation and at recurrent timed intervals to render said starting winding means reversely effective during continued operative effectiveness of said running winding means to effect braking of the motor to a stop with subsequent instantaneous reversal of the motor.

12. In combination with an electric motor capable of running in either direction having running winding means effecting running rotation of the motor in either of its two directions of rotation and starting winding means for starting the inactive motor in one direction or the other or for braking the running motor to a stop and causing it to be started in the opposite direction, of a plurality of switches certain of which are operative to complete circuits continuously to maintain effective running winding operation and others of which are operative intermittently to complete circuits for intermittently starting the motor reversely in one direction or the other, actuators for each of said switches, one actuator being operative to close its associated switch for rendering the motor active for a predetermined time interval while another motor sensitive actuator is rendered operative in response to operation of the motor to open one associated switch and close a second associated switch maintaining thereby the motor active, the actuators for the other switches being operative to close their respective switches for motor braking with instantaneous subsequent reversal of the motor rotation recurrently and at timed intervals during the opening of the switch operated by the motor sensitive actuator.

References Cited in the file of this patent

UNITED STATES PATENTS

| Number | Name | Date |
|---|---|---|
| 2,119,337 | Lockett | May 31, 1938 |
| 2,298,095 | Dunham | Oct. 6, 1942 |
| 2,334,965 | Thacker | Nov. 23, 1943 |
| 2,425,312 | Gower | Aug. 12, 1947 |
| 2,551,395 | Rimann | May 1, 1951 |